United States Patent
Gomes et al.

(10) Patent No.: US 11,947,575 B2
(45) Date of Patent: Apr. 2, 2024

(54) GEOHASH BASED AUTO-SEGMENTATION

(71) Applicant: Telefonaktiebolaget LM Ericsson (publ), Stockholm (SE)

(72) Inventors: Eugene Gomes, Plano, TX (US); Xin Li, Allen, TX (US); Diego Martos, Plano, TX (US); Mahmood Osorio, Rockwall, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/904,714

(22) PCT Filed: Jan. 15, 2021

(86) PCT No.: PCT/IB2021/050277
§ 371 (c)(1),
(2) Date: Aug. 19, 2022

(87) PCT Pub. No.: WO2021/171102
PCT Pub. Date: Sep. 2, 2021

(65) Prior Publication Data
US 2023/0072676 A1    Mar. 9, 2023

Related U.S. Application Data

(60) Provisional application No. 62/704,072, filed on Feb. 27, 2020.

(51) Int. Cl.
G06F 16/28    (2019.01)
G06F 16/2457    (2019.01)
(Continued)

(52) U.S. Cl.
CPC ........ G06F 16/29 (2019.01); G06F 16/24578 (2019.01); G06F 16/285 (2019.01); G06F 16/909 (2019.01)

(58) Field of Classification Search
CPC .. G06F 16/137; G06F 16/152; G06F 16/2255; G06F 16/285; G06F 16/29;
(Continued)

(56) References Cited

U.S. PATENT DOCUMENTS 9,514,155 B1 * 12/2016 Majumdar .............. G06F 16/29
10,117,073 B1 * 10/2018 Dannamaneni ....... H04W 4/023
(Continued)

FOREIGN PATENT DOCUMENTS

CN    110781258 A    2/2020

OTHER PUBLICATIONS

International Search Report and Written Opinion for Application No. PCT/IB2021/050277, dated Apr. 6, 2021, 11 pages.
(Continued)

*Primary Examiner* — Robert W Beausoliel, Jr.
*Assistant Examiner* — Cheryl M Shechtman
(74) *Attorney, Agent, or Firm* — Nicholson De Vos Webster & Elliott LLP (57) ABSTRACT

A method, apparatus and network node for clustering a terrestrial area based on Geohash coordinates by selecting a node based on a Geohash area identified by a Geohash string of a predetermined length; subdividing the Geohash area into subareas by increasing the Geohash string by a length of one; and sequencing through the subareas to identify subarea/subareas that exceed a threshold number of a selected parameter. For subareas not exceeding the threshold number of the selected parameter, combining those subareas into clusters without exceeding the threshold number of the selected parameter in respective clusters. For subareas exceeding the threshold number of the selected parameters, subdividing those subareas into further subareas by increasing the Geohash string by one and sequencing through the further subareas to place the further subareas into clusters without exceeding the threshold number of the selected parameter.

20 Claims, 10 Drawing Sheets

(51) Int. Cl.
G06F 16/29 (2019.01)
G06F 16/909 (2019.01)

(58) Field of Classification Search
CPC ...... G06F 16/35; G06F 16/387; G06F 16/906; G06F 16/909; G06F 16/9537; G06F 18/23; G06F 16/907; H04W 4/021; H04W 4/025; H04W 4/50; H04W 88/08; H04W 40/20
See application file for complete search history.

(56) References Cited

U.S. PATENT DOCUMENTS

| | | | |
|---|---|---|---|
| 10,146,794 B2 | 12/2018 | Mor et al. | |
| 10,810,235 B1* | 10/2020 | Bakshi | G06F 16/9537 |
| 11,115,455 B2* | 9/2021 | Boukhtouta | H04L 61/2503 |
| 2015/0101061 A1* | 4/2015 | Jonas | H04L 63/0428 |
| | | | 726/26 |
| 2015/0148058 A1* | 5/2015 | Eunice | H04W 4/21 |
| | | | 455/456.1 |
| 2016/0321351 A1* | 11/2016 | Mor | G06F 16/35 |
| 2018/0302811 A1* | 10/2018 | Bush | G06F 16/27 |
| 2019/0065530 A1 | 2/2019 | Mor et al. | |
| 2020/0294074 A1* | 9/2020 | Yang | G06Q 20/4093 |
| 2021/0168152 A1* | 6/2021 | Herrema, III | H04L 63/1425 |

OTHER PUBLICATIONS

Anonymous, "Geohash—Wikipedia," May 10, 2017, 5 pages, downloaded from https://en.wikipedia.org/w/index.php?title=Geohash&oldid=779720755.

* cited by examiner

| GeoHash Length | index | # of cellular towers | Source | Neighbor #1 | Neighbor #2 | Neighbor #3 | Neighbor #4 | Neighbor #5 | Neighbor #6 |
|---|---|---|---|---|---|---|---|---|---|
| 4 | 9qj2 | 10 | 9qj2 | | | | | | |
| 4 | 9qj6 | 10 | 9qj6 | | | | | | |
| 5 | 9qj0p | 5 | 9qj0p | | | | | | |
| 4 | 9qj1 | 8 | 9qj1 | 9qj4 | | | | | |
| 5 | 9qj0m | 9 | 9qj0m | 9qj0j | 9qj0n | | | | |
| 5 | 9qj0v | 5 | 9qj0v | 9qj0y | 9qj0r | | | | |
| 5 | 9qj0q | 9 | 9qj0q | 9qj0w | 9qj0t | 9qj0s | | | |
| 4 | 9qjm | 8 | 9qjm | 9qjj | 9qjn | | | | |
| 5 | 9qj0b | 9 | 9qj0b | 9qj0f | 9qj0g | 9qj0e | 9qj07 | 9qj0k | |
| 4 | 9qjd | 7 | 9qjd | 9qjc | 9qj7 | 9qj5 | | | |
| 4 | 9qjt | 8 | 9qjt | 9qju | 9qjv | 9qjy | 9qjx | 9qjr | 9qjp |

GEOHASH BASED AUTO-SEGMENTATION

CROSS-REFERENCE TO RELATED APPLICATIONS

This application is a National stage of International Application No. PCT/IB2021/050277, filed Jan. 15, 2021, which claims the benefit of U.S. Provisional Application No. 62/704,072 filed Feb. 27, 2020, which are all hereby incorporated by reference.

TECHNICAL FIELD

Embodiments of the disclosure relate to the field of geo-segmenting a terrestrial region based on pre-defined criteria; and more specifically, to geo-segmenting a terrestrial region covered by a wireless communications network into clusters based on communication derived criteria or data.

BACKGROUND ART

There are various known ways to divide or segment a terrestrial region into identifiable sections. Some examples are the use of telephone country codes or area codes, and postal zip codes. In metropolitan areas, a city or town may be segmented into neighborhoods, zones, wards, districts, etc. In wireless communications, a network provider generally segments a region based on communication coverage. The segmentation may be dependent on cell coverage in the area and/or the volume of wireless communication traffic a certain node or cell tower handles. In these above examples, the segmentation results in fixed segmented areas where considerable effort is required to re-segment the region. Furthermore, when the density of the measured variable increases in an area to such a point as to require additional segmentation into smaller sub-areas, considerable effort may be needed to solve the further segmentation. For example, when wireless communications traffic increases to such a point for a region, a network provider of the wireless communications network may need to perform systematic analysis to determine how and where to deploy additional towers.

One technique for segmenting a terrestrial region is the use of Geohash. Geohash is a public domain geocode system which encodes a geographic location into a short string of letters and digits. It uses a hierarchical data structure to subdivide a space into a grid shape and each grid shape further subdivides into smaller grids by adding a letter or digit to the string. One well-known Geohash scheme uses a base-32 scheme to hierarchically segment each grid area into 32 smaller grid areas. By adding a letter or digit to the current Geohash string, a grid can sub-divide into 32 smaller grids.

However, current Geohash solutions that are available do not provide an easy method to automatically and/or adaptively segment a terrestrial area into smaller sections. For example, current wireless communication optimization strategies require for custom application and tuning of parameters at a finer granularity based on data usage.

One of the main issues faced by mobile telecommunication operators today is how to best divide the area of mobile coverage into most relevant sections. Existing solutions do not provide an easy, scalable and auto-adaptable solution to segment a terrestrial area into smaller sections for wireless telecommunication-based operations. Existing solutions do not take into account wireless telecommunication nuances/requirements into consideration. This combined with existing solutions that only provide a fixed segmentation of a terrestrial area, make grouping strategy for subdivided areas difficult to achieve.

SUMMARY

Certain aspects of the present disclosure and their embodiments may provide solutions to challenges noted above. In one aspect of the disclosed system, a method provides for clustering a terrestrial area based on Geohash coordinates by selecting a node based on a Geohash area identified by a Geohash string of a predetermined length; subdividing the Geohash area into subareas by increasing the Geohash string by a length of one; and sequencing through the subareas to identify a subarea or subareas that exceed a threshold number of a selected parameter for each subarea. The method further provides, for subareas not exceeding the threshold number of the selected parameter, combining subareas not exceeding the threshold number into clusters without exceeding the threshold number of the selected parameter in respective clusters; and for subareas exceeding the threshold number of the selected parameters, further subdividing the subareas exceeding the threshold number into further subareas by further increasing the Geohash string by one and sequencing through the further subareas to place the further subareas into clusters without exceeding the threshold number of the selected parameter. The method further provides for generating a plurality of clusters for the node based on the Geohash coordinates and the selected parameter.

In a second aspect of the disclosed system, an apparatus for clustering a terrestrial area based on Geohash coordinates is configured to select a node based on a Geohash area identified by a Geohash string of a predetermined length; subdivide the Geohash area into subareas by increasing the Geohash string by a length of one; and sequence through the subareas to identify a subarea or subareas that exceed a threshold number of a selected parameter for each subarea. The apparatus is further configured to, for subareas not exceeding the threshold number of the selected parameter, combine subareas not exceeding the threshold number into clusters without exceeding the threshold number of the selected parameter in respective clusters; and for subareas exceeding the threshold number of the selected parameters, further subdivide the subareas exceeding the threshold number into further subareas by further increasing the Geohash string by one; and sequencing through the further subareas to place the further subareas into clusters without exceeding the threshold number of the selected parameter. The apparatus is further configured to generate a plurality of clusters for the node based on the Geohash coordinates and the selected parameter.

In a third aspect of the disclosed system, a network node of a wireless communication network for clustering a terrestrial area based on Geohash coordinates is configured to select a node based on a Geohash area identified by a Geohash string of a predetermined length; subdivide the Geohash area into subareas by increasing the Geohash string by a length of one; and sequence through the subareas to identify a subarea or subareas that exceed a threshold number of a selected parameter for each subarea. The network node is further configured to, for subareas not exceeding the threshold number of the selected parameter, combine subareas not exceeding the threshold number into clusters without exceeding the threshold number of the selected parameter in respective clusters; and for subareas exceeding the threshold number of the selected parameters, further subdivide the subareas exceeding the threshold number into further subareas by further increasing the Geohash string by one and sequencing through the further subareas to place the further subareas into clusters without exceeding the threshold number of the selected parameter. The network node is further configured to generate a plurality of clusters for the node based on the Geohash coordinates and the selected parameter.

In a fourth aspect of the disclosed system, a computer program comprising instructions which, when executed by at least one processing circuitry of a network node of a wireless communication network, is capable of clustering a terrestrial area based on Geohash coordinates by performing operations. The operations comprise selecting a node based on a Geohash area identified by a Geohash string of a predetermined length; subdividing the Geohash area into subareas by increasing the Geohash string by a length of one; and sequencing through the subareas to identify a subarea or subareas that exceed a threshold number of a selected parameter for each subarea. The operations further comprise, for subareas not exceeding the threshold number of the selected parameter, combining subareas not exceeding the threshold number into clusters without exceeding the threshold number of the selected parameter in respective clusters; and for subareas exceeding the threshold number of the selected parameters, further subdividing the subareas exceeding the threshold number into further subareas by further increasing the Geohash string by one and sequencing through the further subareas to place the further subareas into clusters without exceeding the threshold number of the selected parameter.

The operations further comprise generating a plurality of clusters for the node based on the Geohash coordinates and the selected parameter.

In a fifth aspect of the disclosed system, a carrier containing the computer program according to the fourth aspect is one of an electronic signal, optical signal, radio signal or computer storage medium.

There are, proposed herein, various embodiments which address one or more of the issues disclosed herein. The example documented in the description below uses a combination of cellular tower location and existing methodology of Geohashing as its basis. The solution can easily be expanded to auto-segment any area of focus on the globe using data such as automobile traffic, emergency calls (e.g., 911 calls), population density, power outage reports, disease and pandemic tracking, etc. (these are not an exhaustive list). The resulting segmented area can be used for further operation, such as focus help from law enforcement or rescue/relief efforts, as well as other types of such uses.

Furthermore, certain embodiments may provide one or more of the following technical advantages:
  Provide an auto-adaptable solution to segment a terrestrial area into smaller sections for wireless telecommunication-based operations or improvement;
  Consider wireless telecommunications requirements, but applicable for any use-case with a combination of multiple thresholds at different levels, criterion for slicing and grouping can be configurable per use-case;
  Provide a means to do an adaptive segmentation of a terrestrial area;
  The solution can easily be expanded to auto-segment any area of focus on the globe using data such as automobile traffic, emergency calls, population density, power outage reports, etc.; and The resulting segmented area can be used for further operation, such as focus help from law enforcement or rescue/relief efforts, for example in cases of mass or localized emergency efforts

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

The following description describes methods, apparatus and network node for providing Geohash-based auto-segmentation. The disclosure describes in detail the Geohash segmentation scheme in reference to a wireless communication network and devices wirelessly connected to the various transmission/receiving points (e.g., towers). However, as noted below, the Geohash-based segmentation technique is not limited to the communications networks. The techniques may be readily employed with various different input criteria to Geohash segment a specified terrestrial area or region. The following description describes numerous specific details such as operative steps, resource partitioning/sharing/duplication implementations, use of 32-base Geohash grids, manner of sequencing the grid, and interrelationships of system components to provide a more thorough understanding of the present disclosure. It will be appreciated, however, by one skilled in the art that the embodiments of the present disclosure can be practiced without such specific details. In other instances, control structures, circuits, memory structures, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, model, or characteristic is described in connection with an embodiment, it is submitted that it is within the knowledge of one skilled in the art to effect such feature, structure, characteristic, or model in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some of the embodiments contemplated herein apply to wireless communication technology applicable to $5^{th}$ Generation (5G) technology or New Radio (NR) technology under the $3^{rd}$ Generation Partnership Project (3GPP). Some embodiments can apply to older radio technology, such as 2G, 3G, 4G, LTE, etc., as well. The disclosure mentions a Geohash grid of 32 areas. However, other n-based grid schemes may be used.

Figure 1:
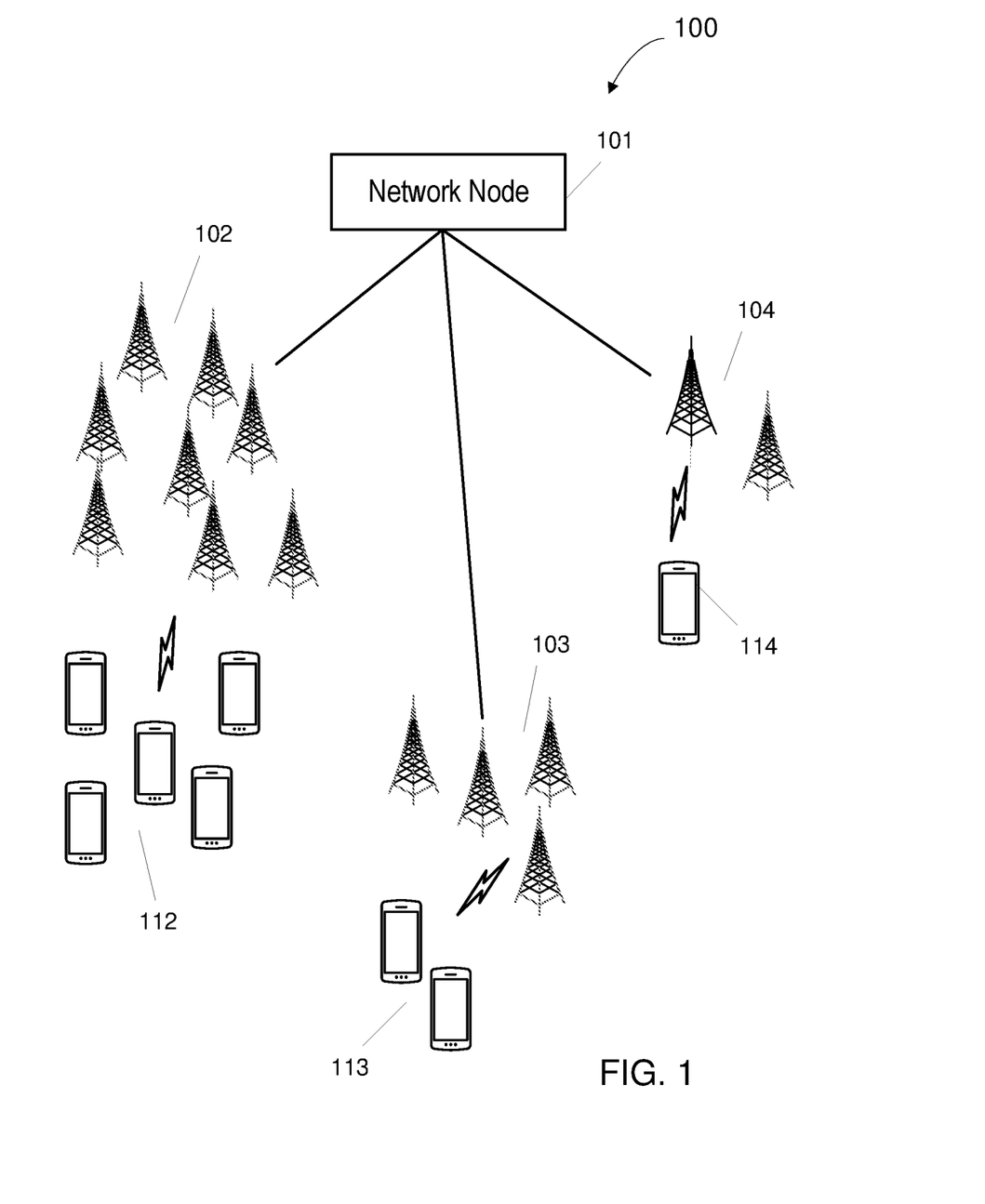
FIG. 1 illustrates a wireless communications network, according to some embodiments of the present disclosure.

FIG. 1 shows a wireless communications network 100 according to some embodiments of the present disclosure. As noted above, the network 100 can at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 100 may be suitable for providing radio communications meeting one or more of the criteria established by the Next Generation Mobile Networks Alliance for the 5th generation of mobile telecommunications standards (e.g., 5G/NR). In some embodiment, the communication network 100 can be a wireless cellular network.

The network 100 comprises one or more radio access nodes. In FIG. 1, multiple radio access nodes 102, 103, 104 are shown, but the skilled person will appreciate that any number of radio access nodes may be provided. The radio access nodes 102, 103, 104 can be referred to as base stations, NodeBs, evolved NodeBs (eNB, or eNodeB), gNodeBs, base transceiver stations, Access Point Base Stations (or just Access Points), base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending on the radio access technology and terminology used. The functions of the radio access nodes 102, 103, 104 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

FIG. 1 shows the radio access nodes grouped into three different groups for explanatory purpose. Other embodiments may have other groupings. Radio access nodes 102 form one grouping, radio access nodes 103 form a second grouping and radio access nodes 104 form a third grouping, within the network 100. As shown, the radio access nodes 102 are more in number for a given area (density), such as with a compacted urban area (e.g., city, town, etc.). The radio access nodes 103 are less in number, indicating an area of less density (e.g., suburban area, etc.). The radio access nodes 104 indicate an area of sparse density (e.g., remote area away from population centers). Within each area, wireless devices communicate with the respective radio access node(s) to provide services to users of the devices as will be familiar to those skilled in the art. Each radio access node 102, 103, 104 further communicates with a network node or nodes, such as network node 101 for co-ordination and control, and provide access to other parts of the network 100 or to other external networks, such as the Internet. FIG. 1 shows wireless terminal devices 112, 113, 114 in communication with respective radio access nodes 102, 103, 104. Each terminal device 112, 113, 114 can be referred as a user equipment (UE), mobile device, mobile terminal device, wireless terminal device, etc. Those skilled in the art will appreciate that wireless signals are transmitted between the radio access nodes 102, 103, 104 and the terminal devices 112, 113, 114 using radio resources which are scheduled by a control node of the network 100, such as network node 101. FIG. 1 shows the density of terminal devices 112, 113, 114 to correspond to the density of the radio access nodes for the groupings. However, in an actual operating environment, the number of connected terminal devices can vary, such that there may not be a one-to-one correlation between terminal device density and radio access node density for an area.

FIG. 1 shows three grouping of radio access nodes 102, 103, 104 in order to illustrate that network 100 coverage areas of terrestrial regions can vary significantly, such as due to population density of people using the terminal devices (e.g., urban, suburban, remote).

The Geohash based auto-segmentation described below provides a means to auto-size and auto-classify a given terrestrial area into an appropriate section for further analytics and operations. The starting point of operation is the largest geohash grid which adaptively begins to scale down to smaller Geohash based grids on pre-defined or automatically derived criteria. Grouping of segmented areas is also possible in case the minimum sizes based on criteria are not met.

One of the main issues faced by mobile telecommunication operators today is how best to divide an area of mobile coverage (e.g., area covered by radio access nodes 102, 103, 104) into most relevant segments, due to dynamics of the mobile phone usage that keep changing. These "relevant segments," can be used to custom apply mobile performance improvement strategies to provide better service and user experience in the network. Therefore, one or more of the regions covered by a network, such as the network 100, can be analyzed, and, when needed, segmented into smaller areas of operational awareness when a number or density of a selected parameter reaches a certain level or threshold. In some embodiments, data that can be harnessed from the network (e.g., by network node 101) or other sources allows for auto-segmenting an area of focus into relevant segments or sections, allowing for different grouping which are referred to below as clusters.

One type of mechanism for collecting network data is a Self-Organizing Network (SON), which is an automated manager. SONs are a critical enabler supporting the widespread deployment of mobile broadband technologies, and can provide functionalities beyond data collection, such as self-configuring, self-optimizing, and self-healing functionalities. A SON associated with the network node 101 may use an optimization manager to automate network optimization where the SON makes the most use of already available functionalities. Thus, a SON or an equivalent manager can be used for automated network data collection in some embodiments.

Figure 2:
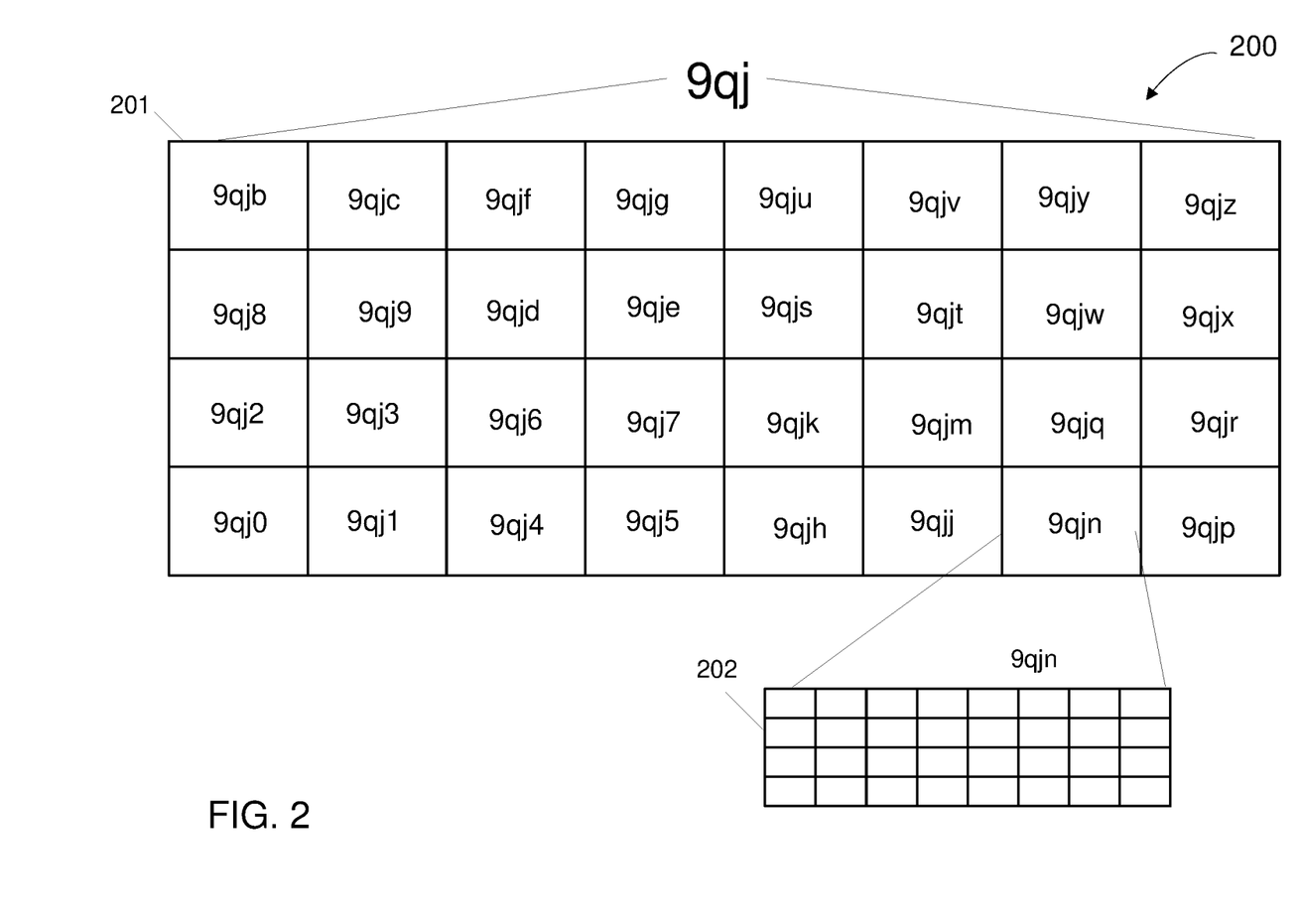
FIG. 2 illustrates an example Geohash grid for use, according to some embodiments of the present disclosure.

FIG. 2 illustrates an example Geohash grid for use, according to some embodiments of the present disclosure. The Geohash system illustrated uses a 32-based grid 200 in which 32 sub-grids (boxes) 201 form a hierarchical structure. Some embodiments may use a Geohash system using a different number base of sub-grids. The grid 200 illustrates "9qj" grid divided into 32 sub-grids 201, where an appended digit or letter to "9qj" (e.g., "9qj_") designates the respective sub-grids 201. Thus, the lower left sub-grid in the example illustration has the designation "9qj0" and the upper right sub-grid has the designation "9qjz." When a sub-grid is to be further segmented, a similar procedure of adding a digit or letter to the Geohash string allows for segmentation into further 32 sub-grids. FIG. 2 shows a further segmentation of "9qjn" into further sub-grids 202 "9qjn_" where the location of the further sub-grid 202 uses the same digit/letter correspondence to "9qj." Thus, the lower left further sub-grid 202 in the example illustration has the designation "9qjn0" and the upper right sub-grid has the designation "9qjnz."

Figure 3:
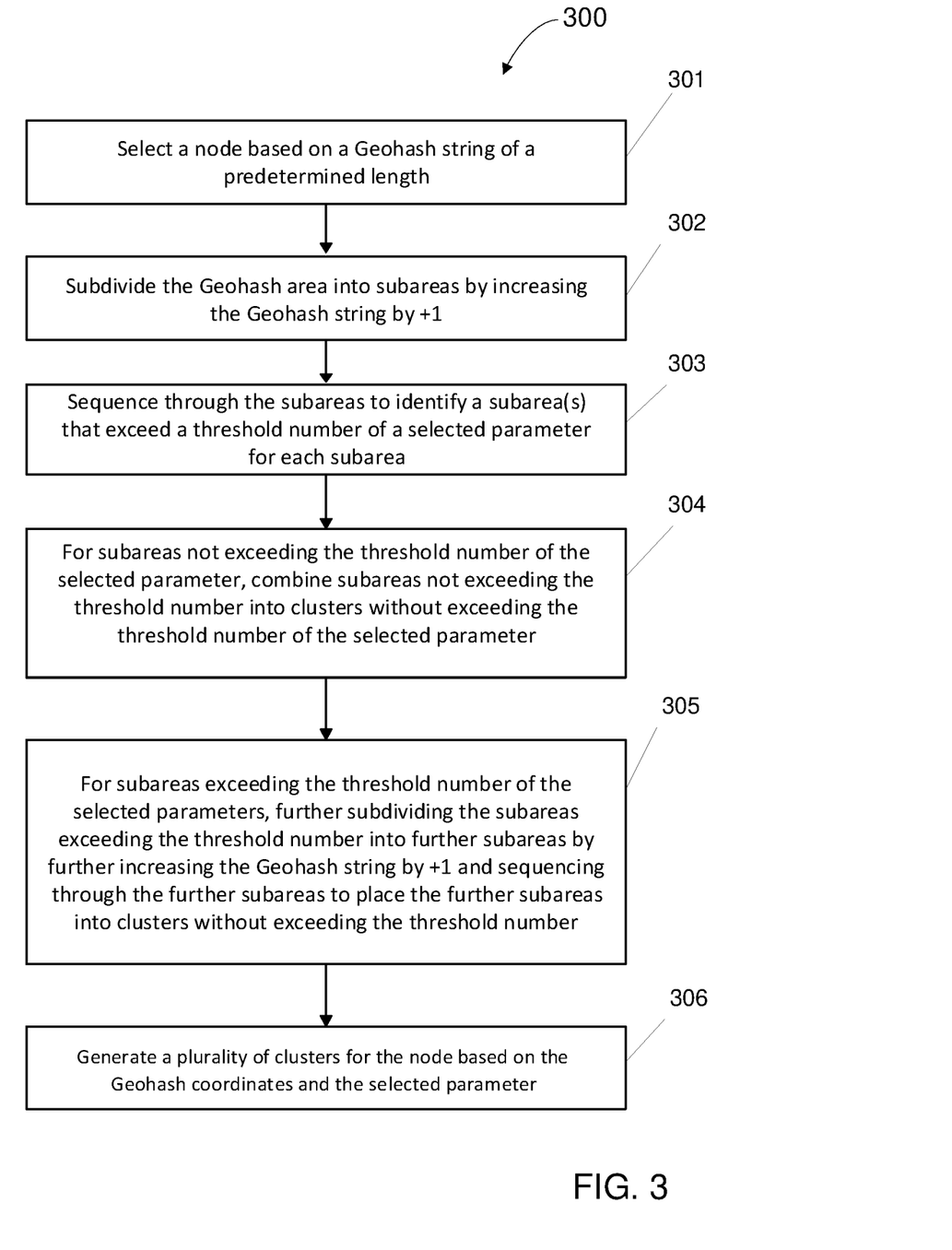
FIG. 3 illustrates a flow diagram for a method of operation, according to some embodiments of the present disclosure.

In reference to FIG. 1, the radio access nodes 102, 103, 104 can be placed into one or more Geohash grid(s). The size of this terrestrial region depends on the string size (number of letters and digits). Then, based on some selected parameter, the network node 101, or some other node of network 100, can segment this region into 32 smaller areas by simply appending a digit or letter to the Geohash string. In areas of higher density of the radio access nodes, the Geohash grid(s) can each be segmented into further 32 smaller sub-grids. Each sub-grid then can further sub-divide into 32 more further sub-grids, each iteration covering smaller terrestrial area. By covering smaller areas, each such area will have lesser number of radio access nodes. Thus, in reference to the example of FIG. 1, the radio access nodes 102 may undergo a number of iterations of segmentation until a desired density of access nodes is reached for a sub-divided grid. Whereas the radio access nodes 103 may undergo lesser number of iterations of sub-dividing and the radio access nodes 104 may undergo still lesser number of iterations. FIG. 3 illustrates an example technique of one such segmentation.

FIG. 3 illustrates a flow diagram for a method of operation of the network node 101, or some other node in the network 100, or some other processing apparatus, to perform a Geohash based auto-segmentation. A method 300 may be automated, so that the segmenting (also referred to as dividing or sub-dividing) and cluster formation described below can be automated. The method 300 starts by selecting (operation 301) as a node based on a Geohash designation to cover a terrestrial region of interest. A Geohash string of a predetermined length is used to select the node. Thus, the initial node size is dependent on the length of the Geohash string.

The method 300 subdivides (operation 302) the Geohash area represented by the node into subareas by increasing the Geohash string by +1. In the 32-base system, the added digit or letter subdivides a grid into 32 sub-grids, as noted in FIG. 2. The method 300 sequences (operation 303) through the subareas to identify one or more subareas that exceed a threshold number of a selected parameter for each subarea. The selected parameter can be any input variable of interest. In reference to FIG. 1, the selected parameter can be the radio access node, the terminal devices connected to the radio access nodes, communications traffic generated by the terminal devices, or any other metric related to the operation of the radio access nodes 102, 103, 104 or the terminal devices 112-114 connected to the radio access nodes 102, 103, 104. Other metrics such as frequency information traffic volume, traffic density, call drop rates, live feed (such as twitter usage), or any other metric, can be used as input for the selected parameter. The earlier described SON manager, or some other automated mechanism, can automate data collection, as well as automated analysis for selecting the parameter. A purpose of the segmentation is to continue reducing the density of the selected parameter until the segmentation approaches or reaches a desired threshold number. In this manner, grid areas can combine to reform as a cluster, where each cluster contains no more than the selected threshold number of whatever metric used for the parameter.

Therefore, for subareas not exceeding the threshold number of the selected parameter, the method 300 combines (operation 304) those subareas not exceeding the threshold number into grouped clusters without each of the clusters exceeding the number of the selected parameter. For subareas exceeding the threshold number of the selected parameters, those subareas exceeding the threshold number are further subdivided (operation 305) by further increasing the Geohash string by +1; and sequencing through the further subareas by performing the sequencing operation 303 through the further subareas to place the further subareas into grouped clusters without exceeding the threshold number, by performing an operation equivalent to operation 304. For those further subareas still exceeding the threshold number, the method performs further segmentation by performing iterations of operations 303, 304, 305 until all parameters are placed into clusters, where no cluster exceeds the threshold number of the selected parameter. Once the method 300 completes the iterations of segmenting subareas (grids), the method 300 generates (operation 306) a plurality of clusters for the node, where the clusters are identified according to Geohash coordinates and the size of the terrestrial area covered by each cluster is dependent on the selected parameter.

Figure 4:
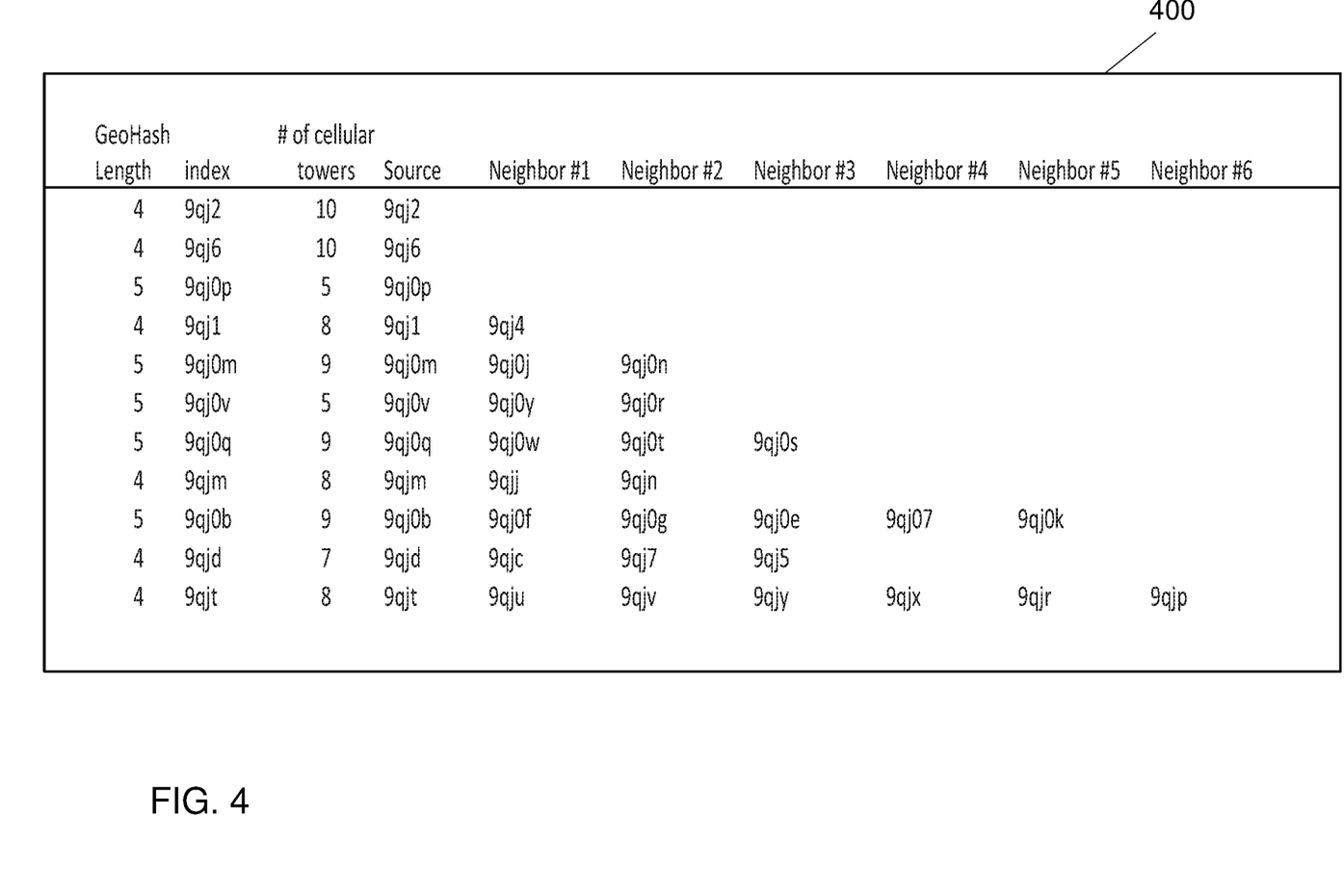
FIG. 4 illustrates an example diagram for grouping subareas into clusters, according to some embodiments of the present disclosure.

FIG. 4 shows a result of performing the method 300 based on the radio access nodes 102, 103, 104. Chart 400 shows "9qj" of FIG. 2 as the starting node. The label "# of cellular towers" correspond to the radio access nodes 102, 103, 104. This is used as the selected parameter in some embodiments. In some embodiments, the number of terminals devices connected to each radio access node, or amount of traffic generated by the terminal devices for each radio access node, or some other metric, determines the parameter for each radio access node. The threshold number not to exceed is chosen as 10 in the example. This number is an arbitrary number chosen for explanatory purpose. In normal day-to-day operation for a communications network, this number can be much higher.

Chart 400 shows that subareas "9qj2" and "9qj6" have reached the threshold number. Thus, each of these subareas forms its own cluster (e.g., stand alone as a cluster) based on a Geohash length of 4. Subareas "9qj1" and "9qj4" are combined to form a cluster of 8 towers, where the cluster is identified by a Geohash length of 4. Subarea "9qj0" requires further segmentation to form into 5 different clusters (9qj0p, 9qj0m, 9qj0v, 9qj0q, 9qj0b). One further subarea "9qj0p" stands alone as a cluster with 5 towers in the cluster. One cluster "9qj0b" is combined with five neighboring subareas to form a cluster of six subareas. Chart 400 shows the identification of each cluster by the Geohash string under "index" and the list of subareas that make up the cluster. Note that subareas having different Geohash string length are not combined into the same cluster. Thus, a given cluster only contains subareas having the same Geohash length. Note that no cluster exceeds the threshold number, which is 10 in this example embodiment. If one of the 5 Geohash length subareas had still contained more than 10 towers, then another iteration of generating length six subareas would have been performed.

Figure 5:
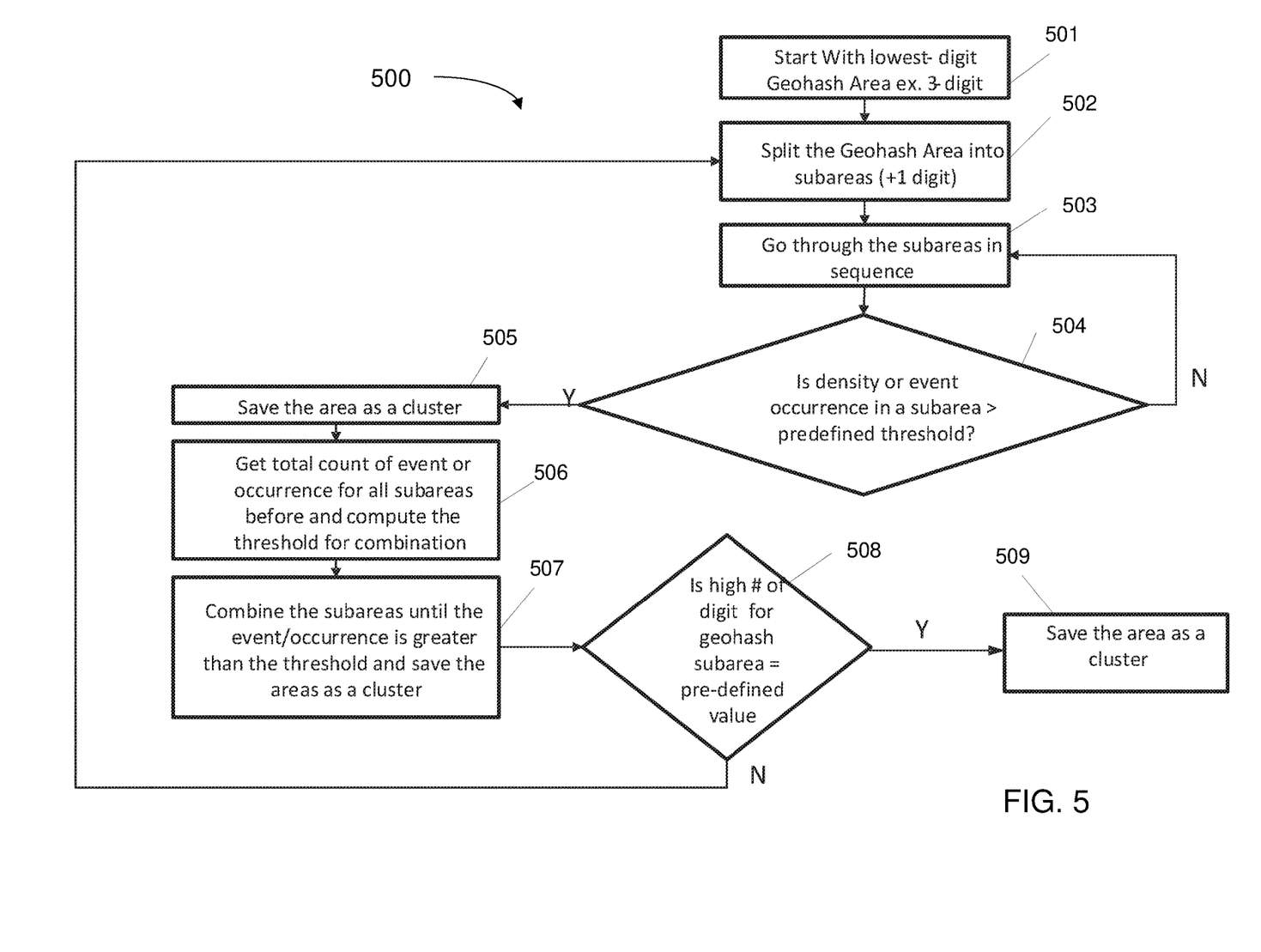
FIG. 5 illustrates a flow diagram of a more detailed example for the operations shown in FIG. 3, according to some embodiments of the present disclosure.

FIG. 5 illustrates a flow diagram of a more detailed example for the operations shown in FIG. 3, according to some embodiments of the present disclosure. FIG. 5 shows a method 500 in which operation 501 corresponds to operation 301; operation 502 corresponds to operation 302; operation 503, 504 correspond to operation 303; operations 504, 505, 506, 507 correspond to operation 304; operations 504, 506, 507, 508, 502, 503 correspond to operation 305; and operations 505, 509 correspond to operation 306. Operation 508 may be utilized in some embodiments where a pre-defined maximum length for the Geohash length, when reached, stops the segmentation for further subareas.

The description of method 500 shows performing the segmentation for identifying clusters based on a selected parameter, where the starting Geohash length is 3 and the maximum length is set at 7:

501—Start with a lowest digit Geohash (example: 3-digit (156 km×156 km). This 3-digit represents the smallest Geohash size. There is no grouping of the lower digit Geohash (example: a 3-digit Geohash, such that Geohash 4 will not be grouped to Geohash 3).

502, 503, 504—If number of cellular towers (density), events or occurrences (selected parameter) is greater than a configurable threshold (e.g., 10 cellular towers), it will be further split into the next Geohash digit within the area.

Current use case: split by cellular tower density as parameter.

Other use cases: split by traffic (number of calls) or throughput, population, areas with higher fire incidence, more tornado hits, call drop rate, live feed such as twitter, etc., as parameter.

Two operational steps to grouping the child areas:

506—First, go through the areas in sequence and add up the number of cellular towers, events or occurrences until reach an area that needs to segment or no more areas (other use cases will be relative data for splitting or joining). Use the total number to determine the threshold (e.g., if <10, =10; if 10-20, total #/2; if 20-30, total #/3, etc.).

506, 507—Second, group the child areas and combine density, events or occurrences until greater than the threshold or reach an area that needs to split or no more areas.

507—Areas with sparse density, events or occurrences will be added to the group to keep area continuous. The grouping should be within the same source Geohash area.

508—The split will stop when the Geohash length reaches a certain pre-defined size, e.g., 7-digits (153 m×153 m).

Figure 6:
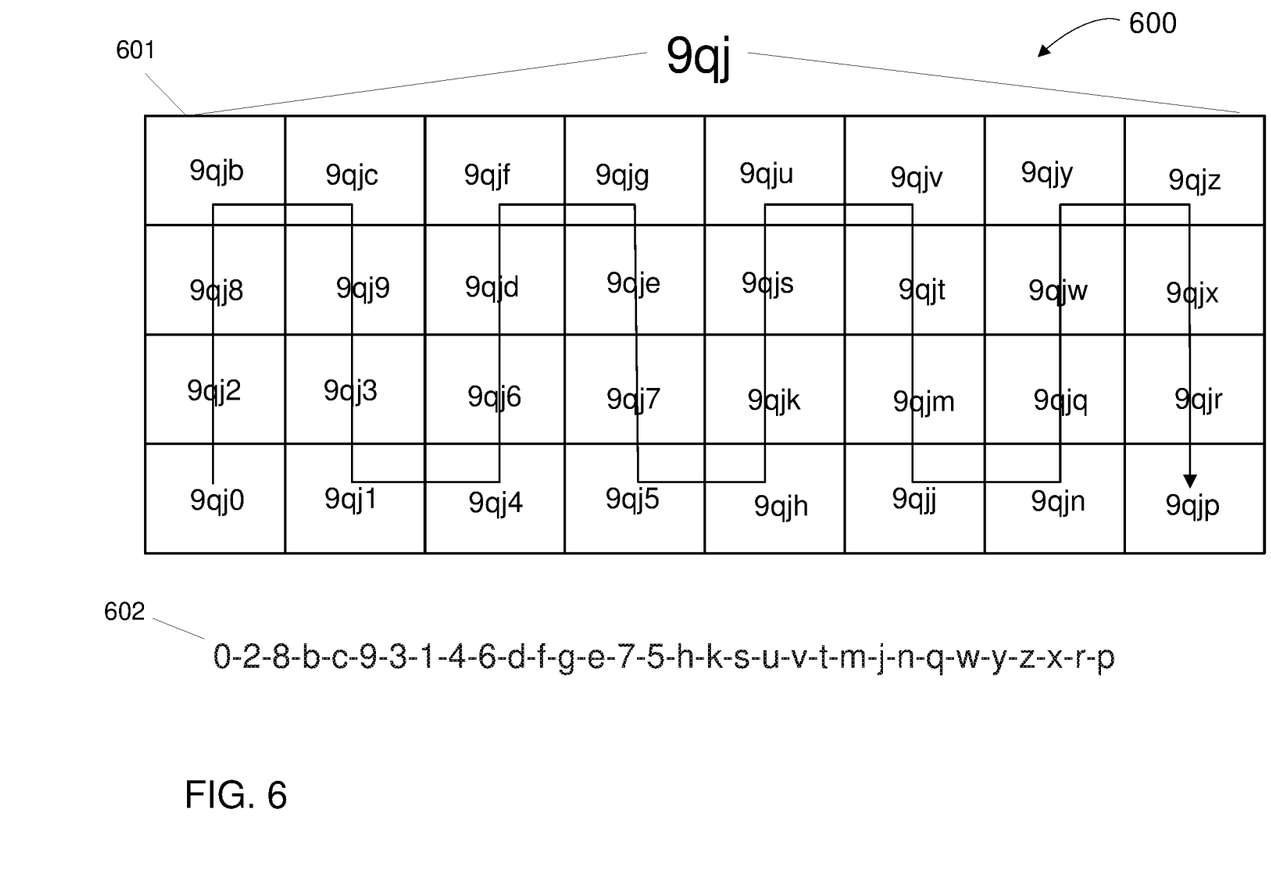
FIG. 6 illustrates an example sequencing pattern through a Geohash grid, according to some embodiments of the present disclosure.

FIG. 6 shows an example sequencing pattern through a Geohash grid to perform a grouping sequence, according to some embodiments of the present disclosure. Geohash grid 601 is equivalent to the "9qj" grid of FIG. 2. Although a variety of patterns can be used, in some embodiments the pattern for identifying which subareas are to be grouped into a cluster, while not exceeding the threshold number, sequences through adjacent subareas without a diagonal transition. Furthermore, one particular pattern 602 shows the travel through the subarea grid 601 through adjacent subareas. A line through "9qj" in FIG. 6 shows the pattern 602 ordered as 0-2-8-b-c-9-3-1-4-6-d-f-g-e-7-5-h-k-s-u-v-t-m-j-n-q-w-y-z-x-r-p. The digits and letters of pattern 602 correspond to the last digit or letter of the subareas of "9qj." By using the sequence pattern 602, the grouped subareas form a cluster having continuously connected subareas or closely associated neighbors.

Figure 7:
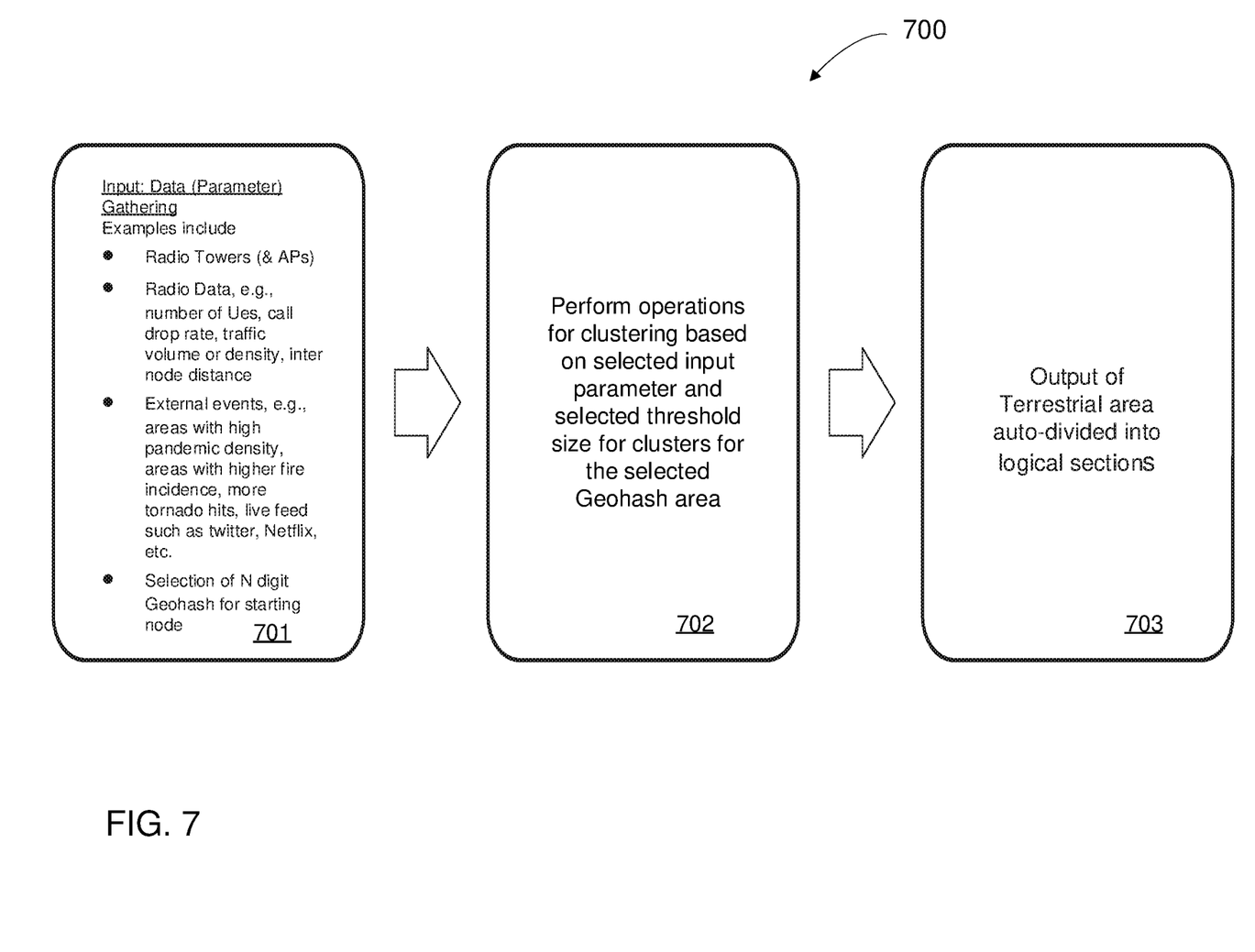
FIG. 7 illustrates a method to define and identify Geoclusters of relevance, according to some embodiments of the present disclosure.

FIG. 7 shows a method to define and identify Geo-clusters of relevance, according to some embodiments of the present disclosure. Method 700 shows a broader perspective of performing the Geohashing to auto-segment. The above description described Geohash based auto segmentation in reference to wireless communication. However, the technique may be implemented in other areas and need not be limited to communication. Thus, operation 701 identifies various data for use as parameter input. Other than metrics related to wireless (radio) access nodes and related data, Geohash based auto segmentation can be applied to many other inputs, including, but not limited to, identifying and clustering: areas with high disease or pandemic density, areas with high fire incidence, areas of tornado activity, automotive traffic, emergency calls, population density, power outages, segment of the population streaming a certain content (e.g., Netflix), etc. (these are not an exhaustive list). The resulting segmented area can be used for further operation, such as focus help from law enforcement or rescue/relief efforts, as well as other types of uses. In operation 702, the method 300 uses a collection of data for input as the selected parameter and perform the operations 301-305 to generate an output 703. The resulting output is a list of Geohashed identified terrestrial areas divided into logically grouped sections (e.g., clusters), where the grouping is based on the density of the input parameter.

Figure 8:
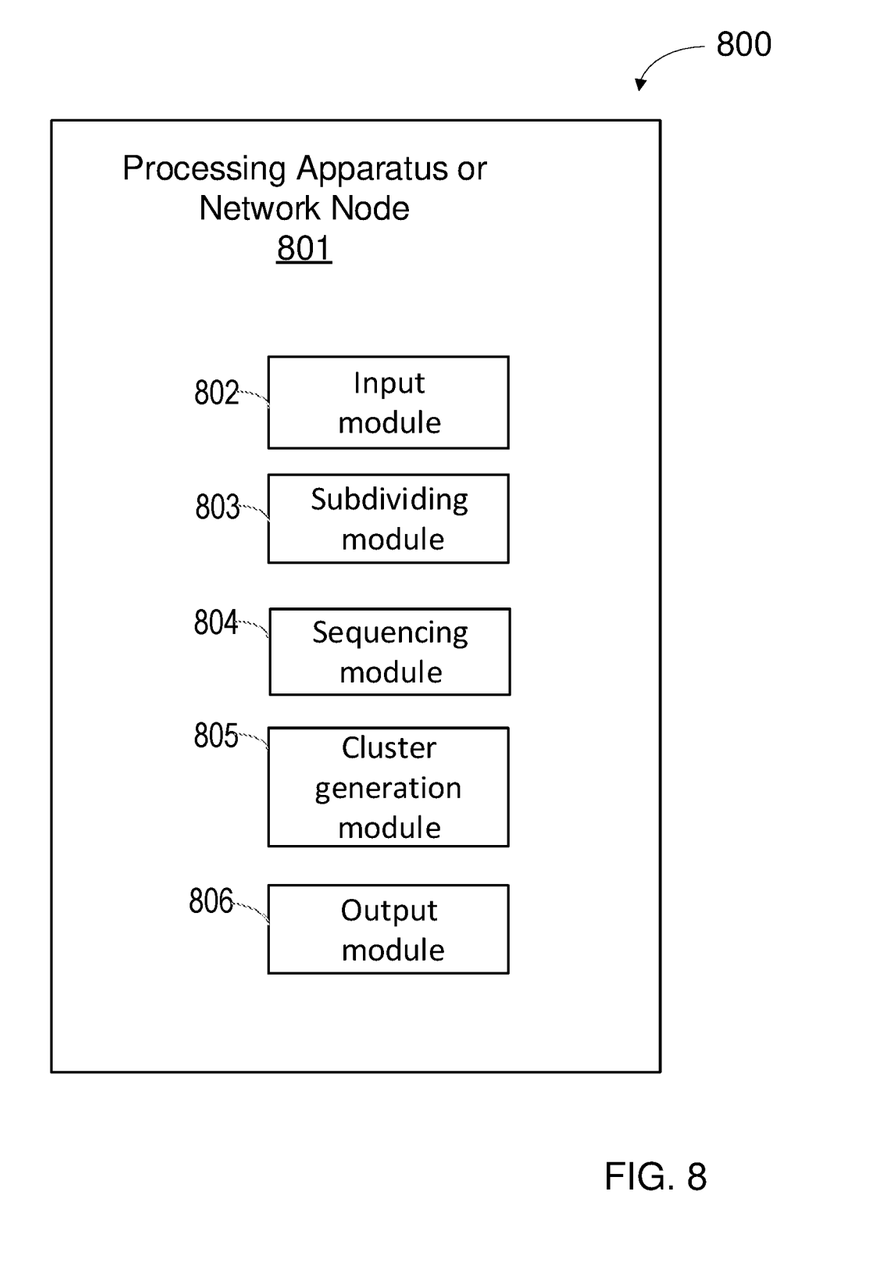
FIG. 8 illustrates a processing apparatus or network node, according to some embodiments of the present disclosure.

FIG. 8 is a schematic diagram 800 of a processing apparatus or a network node 801 according to some embodiments of the present disclosure. The apparatus/node 801 can implement the various techniques described herein, including the method 300 of FIG. 3. In reference to the apparatus/node 801 being a network node in a communications network, node 801 can be the network node 101 of FIG. 1.

The apparatus/node 801 comprises an input module 802, a subdividing module 803, sequencing module 804, a cluster generation module 805 and an output module 806. The input module 802 can perform operations to collect and/or obtain data for input corresponding to the earlier described selected parameter (e.g., operation 701 of FIG. 7). The input module 802 can obtain data from the earlier described SON in some embodiments. The input data may also comprise Geohash information, in order to perform operation 301 of the method 300. The subdividing module 803 can perform operations corresponding to the operation 302 for subdividing the Geohash area into subareas. The sequencing module 804 can perform operations corresponding to the operation 303 to sequence through the subareas. The cluster generation module 805 can perform operations corresponding to the operations 304, 305 to segment the subareas and further subareas to generate grouped Geohash subareas and further subareas, which are placed into cluster groupings based on threshold limits set for the parameter. The output module 806 generates the Geohashed segmented locations associated with the input parameter as output. When node 801 is a processing apparatus, a variety of processing devices, including general purpose computers, can perform operations corresponding to modules 802-806.

In some embodiments, the modules 802-806 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the apparatus/node 801 are implemented in software. In other embodiments, the modules of the apparatus/node 801 are implemented in hardware. In further embodiments, the modules of the apparatus/node 801 are implemented in a combination of hardware and software. In some embodiments, the computer program can be provided on a carrier, where the carrier is one of an electronic signal, optical signal, radio signal or computer storage medium.

Figure 9:
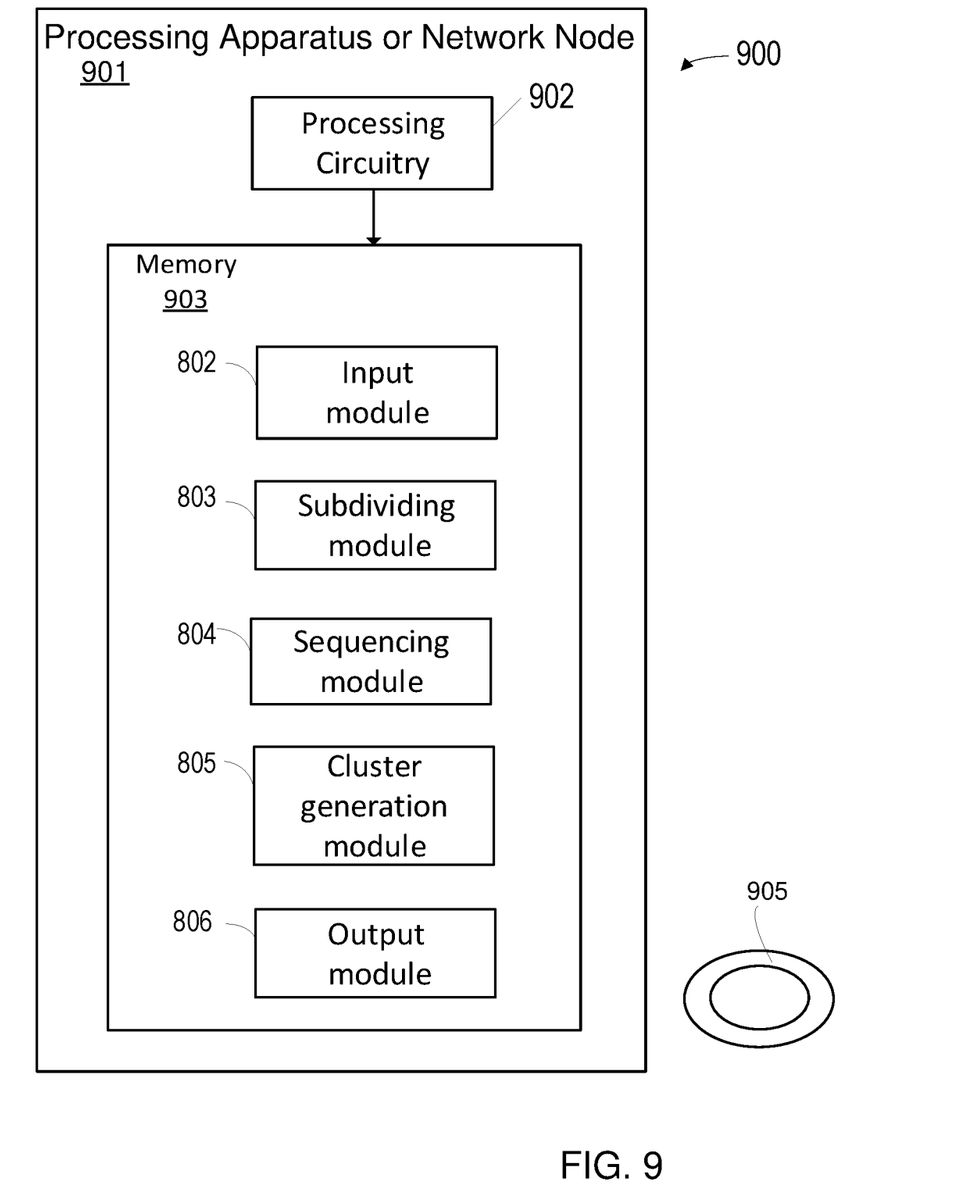
FIG. 9 illustrates another processing apparatus or network node, according to some embodiments of the present disclosure.

FIG. 9 is a schematic diagram 900 of a processing apparatus/network node 901 according to some embodiments of the present disclosure. The apparatus/node 901 can implement the various techniques described herein, including the method 300 of FIG. 3. In reference to the node being a network node in a communications network, apparatus/node 901 can be the network node 101 of FIG. 1. The apparatus/node 901 can be configured to implement the modules 802-806 of FIG. 8, wherein the instructions of the computer program for providing the functions of modules 802-806 reside in memory 903.

The apparatus/node 901 comprises processing circuitry (such as one or more processors) 902 and a non-transitory machine-readable medium, such as the memory 903. The processing circuitry 902 provides the processing capability. The memory 903 can store instructions which, when executed by the processing circuitry 902, are capable of configuring the apparatus/node 901 to perform the methods described in the present disclosure. The memory can be a computer readable storage medium, such as, but not limited to, any type of disk 905 including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

Figure 10:
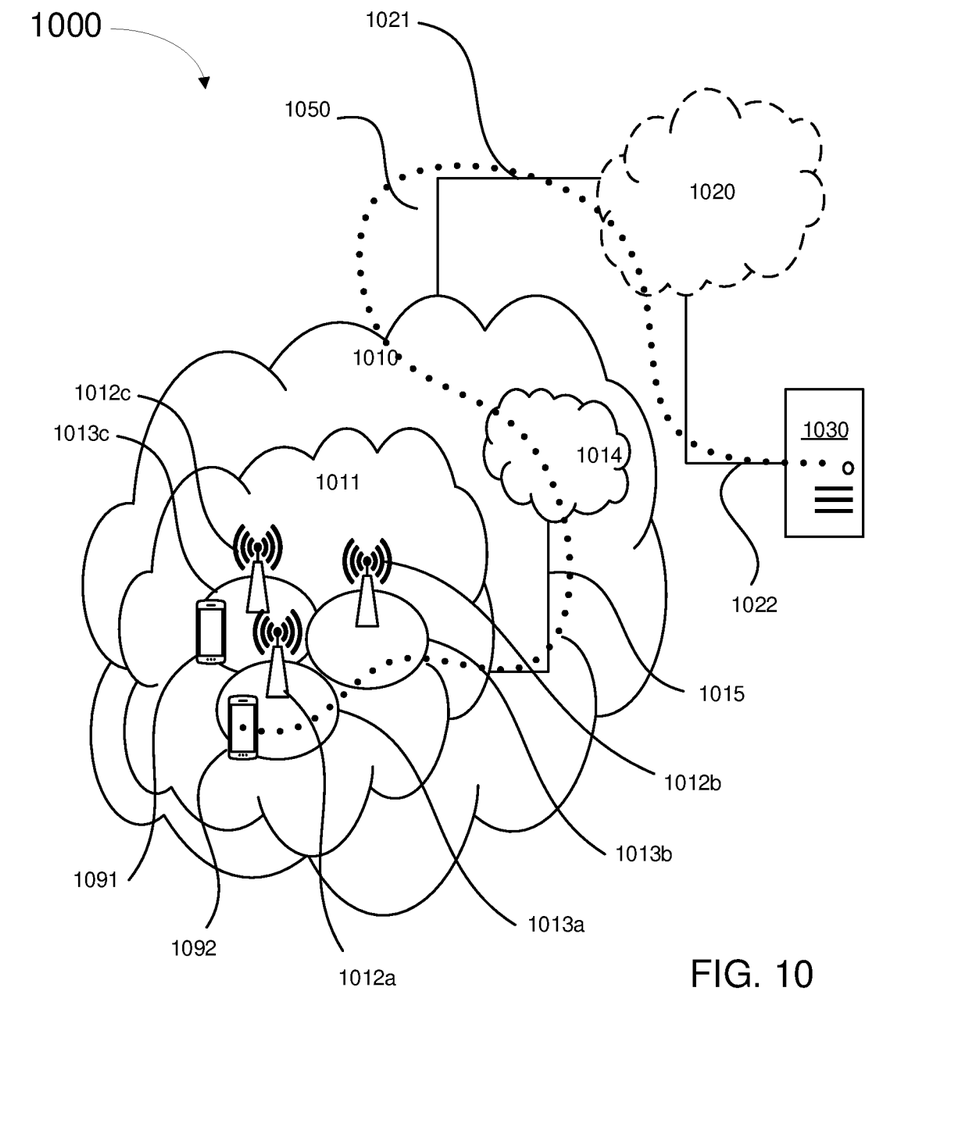
FIG. 10 illustrates a communication system, according to some embodiments of the present disclosure.

With reference to FIG. 10, in accordance with some embodiment, a communication system 1000 includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first terminal device 1091 located in coverage area 1013c is configured to wirelessly connect to, or be paged by, the corresponding base station 1012c. A second terminal device 1092 in coverage area 1013a is wirelessly connectable to the corresponding base station 1012a. While a plurality of terminal devices 1091, 1092 are illustrated in this example, the disclosed embodiments are equally applicable to a situation where a sole terminal device is in the coverage area or where a sole terminal device is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 enables connectivity between the connected terminal devices 1091, 1092 and host computer 1030. The connectivity may be described as an over-the-top (OTT) connection 1050. Host computer 1030 and the connected terminal devices 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected terminal device 1091. Similarly, base station 1012 need not be aware of the future routing of an outgoing uplink communication originating from the terminal device 1091 towards the host computer 1030.

The various techniques described in the present disclosure can be practiced in one or more network nodes of communication system 1000, including core network 1014 and base station 1012a, 1012b, 1012c.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method for clustering a terrestrial area based on Geohash coordinates, the method comprising:
    selecting a node based on a Geohash area identified by a Geohash string of a predetermined length;
    subdividing the Geohash area into subareas by increasing the Geohash string by a length of one;
    sequencing through the subareas to identify a subarea or subareas that exceed a threshold number of a selected parameter for each subarea by sequencing through adjacent subareas without a diagonal transition;
    for subareas not exceeding the threshold number of the selected parameter, combining subareas not exceeding the threshold number into clusters without exceeding the threshold number of the selected parameter in respective clusters, but not combining subareas having different Geohash length into a same cluster;
    for subareas exceeding the threshold number of the selected parameters, further subdividing the subareas exceeding the threshold number into further subareas by further increasing the Geohash string by one and sequencing through the further subareas to place the further subareas into clusters without exceeding the threshold number of the selected parameter; and
    generating a plurality of clusters for the node based on the Geohash coordinates and the selected parameter.

2. The method according to claim 1, wherein the predetermined length of the Geohash string identifying the node is a length of 3.

3. The method according to claim 1, wherein the further subdividing the subareas exceeding the threshold number into further subareas by further increasing the Geohash string by one and sequencing through the further subareas comprises further subdividing the subareas by increasing the Geohash string by a length of one, until no subarea exceeds the threshold number of the selected parameter or until the subdividing reaches a predetermined maximum Geohash string length.

4. The method according to claim 3, wherein the predetermined maximum Geohash string length for stopping the further subdividing is a length of 7.

5. The method according to claim 1, wherein when sequencing through the subareas to identify the subarea or subareas that exceed the threshold number, sequencing through adjacent subareas represented by a 32-box sub-grid of a Geohash grid.

6. The method according to claim 5, wherein the sequencing follows a grid pattern of 0-2-3-1-4-6-d-9-8-b-c-f-g-e-7-5-h-k-m-j-n-q-w-t-s-u-v-y-z-x-r-p for the 32-box sub-grid.

7. The method according to claim 1, wherein the selected parameter is a transmission tower of a wireless communication network and each cluster is limited by a threshold number of transmission towers.

8. The method according to claim 1, wherein the selected parameter is a base station or an access point, or both, and each cluster is limited by a threshold number of the base station or access point, or both.

9. The method according to claim 1, wherein the selected parameter is a number of terminal devices connected to a wireless communication network and each cluster is limited by a threshold number of terminal devices.

10. An apparatus for clustering a terrestrial area based on Geohash coordinates, wherein the apparatus comprising:
    a processor; and
    a memory containing instructions which, when executed by the processor, cause the apparatus to perform operations to:
        select a node based on a Geohash area identified by a Geohash string of a predetermined length;
        subdivide the Geohash area into subareas by increasing the Geohash string by a length of one;
        sequence through the subareas to identify a subarea or subareas that exceed a threshold number of a selected parameter for each subarea by sequencing through adjacent subareas without a diagonal transition;
        for subareas not exceeding the threshold number of the selected parameter, combine subareas not exceeding the threshold number into clusters without exceeding the threshold number of the selected parameter in respective clusters, but not combining subareas having different Geohash length into a same cluster;
        for subareas exceeding the threshold number of the selected parameters, further subdivide the subareas exceeding the threshold number into further subareas by further increasing the Geohash string by one and sequencing through the further subareas to place the further subareas into clusters without exceeding the threshold number of the selected parameter; and
        generate a plurality of clusters for the node based on the Geohash coordinates and the selected parameter.

11. The apparatus according to claim 10, wherein when subdividing the subareas exceeding the threshold number into further subareas by further increasing the Geohash string by one and to sequence through the further subareas, the apparatus is configured to further subdivide the subareas by increasing the Geohash string by a length of one, until no subarea exceeds the threshold number of the selected parameter or until the subdividing reaches a predetermined maximum Geohash string length.

12. The apparatus according to claim 11, wherein the predetermined length of the Geohash string identifying the node is a length of 3 and wherein the predetermined maximum Geohash string length for stopping the further subdividing is a length of 7.

13. The apparatus according to claim 10, wherein when sequencing through the subareas to identify the subarea or subareas that exceed the threshold number, the apparatus is configured to sequence through adjacent subareas represented by a 32-box sub-grid of a Geohash grid.

14. The apparatus according to claim 13, wherein the apparatus is configured to sequence through adjacent subareas following a grid pattern of 0-2-3-1-4-6-d-9-8-b-c-f-g-e-7-5-h-k-m-j-n-q-w-t-s-u-v-y-z-x-r-p for the 32-box sub-grid.

15. A network node of a wireless communication network for clustering a terrestrial area based on Geohash coordinates, wherein the network node comprising:
 a processor; and
 a memory containing instructions which, when executed by the processor, cause the network node to perform operations to:
  select a node based on a Geohash area identified by a Geohash string of a predetermined length;
  subdivide the Geohash area into subareas by increasing the Geohash string by a length of one;
  sequence through the subareas to identify a subarea or subareas that exceed a threshold number of a selected parameter for each subarea by sequencing through adjacent subareas without a diagonal transition;
  for subareas not exceeding the threshold number of the selected parameter, combine subareas not exceeding the threshold number into clusters without exceeding the threshold number of the selected parameter in respective clusters, but not combining subareas having different Geohash length into a same cluster;
  for subareas exceeding the threshold number of the selected parameters, further subdivide the subareas exceeding the threshold number into further subareas by further increasing the Geohash string by one and sequencing through the further subareas to place the further subareas into clusters without exceeding the threshold number of the selected parameter; and
  generate a plurality of clusters for the node based on the Geohash coordinates and the selected parameter.

16. The network node according to claim 15, wherein when subdividing the subareas exceeding the threshold number into further subareas by further increasing the Geohash string by one and to sequence through the further subareas, the network node is configured to further subdivide the subareas by increasing the Geohash string by a length of one, until no subarea exceeds the threshold number of the selected parameter or until the subdividing reaches a predetermined maximum Geohash string length.

17. The network node according to claim 16, wherein the predetermined length of the Geohash string identifying the node is a length of 3 and wherein the predetermined maximum Geohash string length for stopping the further subdividing is a length of 7.

18. The network node according to claim 15, wherein the selected parameter is a transmission tower of a wireless communication network, a base station, or an access point and each cluster is limited by a threshold number of transmission towers, base stations, or access points, respectively.

19. The network node according to claim 15, wherein the selected parameter is a number of terminal devices connected to a wireless communication network and each cluster is limited by a threshold number of terminal devices.

20. A non-transitory computer readable storage medium comprising instructions which, when executed by at least one processing circuitry of a network node of a wireless communication network, is capable of clustering a terrestrial area based on Geohash coordinates by having the network node perform operations comprising:
 selecting a node based on a Geohash area identified by a Geohash string of a predetermined length;
 subdividing the Geohash area into subareas by increasing the Geohash string by a length of one;
 sequencing through the subareas to identify a subarea or subareas that exceed a threshold number of a selected parameter for each subarea by sequencing through adjacent subareas without a diagonal transition;
 for subareas not exceeding the threshold number of the selected parameter, combining subareas not exceeding the threshold number into clusters without exceeding the threshold number of the selected parameter in respective clusters, but not combining subareas having different Geohash length into a same cluster;
 for subareas exceeding the threshold number of the selected parameters, further subdividing the subareas exceeding the threshold number into further subareas by further increasing the Geohash string by one and sequencing through the further subareas to place the further subareas into clusters without exceeding the threshold number of the selected parameter; and
 generating a plurality of clusters for the node based on the Geohash coordinates and the selected parameter.

* * * * *